United States Patent [19]
Andersen et al.

[11] Patent Number: 4,972,566
[45] Date of Patent: Nov. 27, 1990

[54] METHOD OF REPAIRING A GLASS CONTAINER INSPECTING MACHINE

[75] Inventors: Robert P. Andersen, Monroe; Paul F. Scott, Hartford, both of Conn.; Edward F. Vozenilek, Clarks Summit, Pa.

[73] Assignee: Emhart Industries, Inc., Towson, Md.

[21] Appl. No.: 513,791

[22] Filed: Apr. 24, 1990

Related U.S. Application Data

[60] Division of Ser. No. 414,920, Sep. 29, 1989, which is a continuation-in-part of Ser. No. 253,828, Oct. 5, 1988, Pat. No. 4,888,824.

[51] Int. Cl.$^5$ .............................................. B23P 6/00
[52] U.S. Cl. .................................... 29/402.08; 65/27; 65/29
[58] Field of Search ........... 29/402.08, 402.01, 402.03; 65/27, 29, 160

[56] References Cited

U.S. PATENT DOCUMENTS

| | | | |
|---|---|---|---|
| 4,216,523 | 8/1980 | Harford | 29/402.08 |
| 4,806,503 | 2/1989 | Yoshida et al. | 29/402.08 |
| 4,830,985 | 5/1989 | Araghi et al. | 29/402.08 |

Primary Examiner—P. W. Echols
Assistant Examiner—David D. Bryant
Attorney, Agent, or Firm—Spencer T. Smith

[57] ABSTRACT

A glass container inspection machine includes a head assembly, a console, and a cable connecting the two. The head assembly includes a measuring oscillator and a reference oscillator the outputs of which are applied to a Phase Detector Multiplier. A fixed resistance in the output circuit of the measuring oscillator is selected so that the output of the Phase Detector Multiplier is the same no matter what the frequency of the oscillation. The oscillation and the Phase Detector Multiplier are part of a Phase Locked Loop, the amplifier portions of which are in the console. The machine is comprised of four such data channels, each of which includes a head assembly operating at a different oscillator frequency. All components that are frequency dependent are included in the head assembly while all components in the console are frequency independent. Thus the output of any of the head assemblies may be connected via the cable to any of the data channels of the console. The entire system may be spared with a single head assembly that operates at a frequency that is different from the other head assemblies.

4 Claims, 4 Drawing Sheets

METHOD OF REPAIRING A GLASS CONTAINER INSPECTING MACHINE

This is a division of co-pending application Ser. No. 414,920 filed on Sept. 29, 1989, which is a continuation in part of Ser. No. 253,828 filed on Oct. 5, 1988, now U.S. Pat. No. 4,888,824.

BACKGROUND OF THE INVENTION

A bottle or container is formed from a gob of molten glass in an individual section glass container forming machine by first pressing or blowing the gob into a parison and then blowing the parison into the container. When glass is uniformly distributed in this process, wall thickness will be uniform, but when glass distribution is not uniform, thin spots can occur which may result in bottle failure during filling or handling.

The high dielectric constant of glass makes it possible to measure the electrical capacitance of the wall of a glass container located against two elongated electrodes of a sensor which contact the bottle as it is rolled along the sensor. This capacitance increases monotonically as the thickness of the glass container increases and can be measured using an electronic circuit to convert the capacitance to a voltage. A voltage representative of the thickness of the wall can be continuously generated as the bottle rolls along the sensor, and if the voltage decreases below a selected value (the value which represents the minimal wall thickness), the bottle being tested can be rejected.

Most capacitance type glass container wall thickness inspection devices available suffer from accuracy problems due to measuring the small changes in capacitance caused by changes in wall thickness (typically on the order of $10^{-3}$ Picofarad change in measured capacitance per $10^{-3}$ inch change in wall thickness), and the non-linear change in capacitance as a function of thickness over the range provided by glass containers.

The prior art capacitance type wall thickness inspection devices comprise a head assembly attached to a conveyer which is conveying the glass bottles to be inspected, a console which is separate from the head assembly and located some distance from the conveyer and an electrical cable connecting the head assembly and the console. The head assembly contains a measuring oscillator circuit which is analogous to a radio transmitter, with the frequency of the transmission being modulated by the capacitance of the glass wall being inspected. The console contains a reference oscillator circuit which is closely matched to the measuring oscillator circuit. This reference circuit operates on the heterodyne principle and may be thought of as a receiver tuned to the frequency of the measuring oscillator. The frequency difference between the measuring and reference oscillator provides a measure of the wall thickness of the glass containers being inspected. Because the oscillator in the console has to be closely matched to the oscillator in the head assembly, every time a head assembly is replaced, the console oscillator circuit must also be replaced. Generally, a wall thickness inspection machine will include four different data channels, each of which inspects the wall thickness of a different part of the container. To avoid interference, each measuring oscillator in each channel operates at a different frequency. Thus a wall inspection station will have four different reference oscillator assemblies in the console, each matched to one of the four different head oscillator assemblies. Since the oscillator circuits are relatively fragile, glass container inspection machines must keep spare replacement oscillators in stock, otherwise they may have to shut down a production line. Since each head assembly requires a matched console oscillator assembly, the glass manufacturers must generally keep in stock four different sets of head oscillators and matching console oscillator assemblies.

SUMMARY OF THE INVENTION

It is an object of the invention to provide a capacitance type wall thickness inspection apparatus in which the output of the head assembly is independent of the oscillator frequency of the measuring oscillator.

It is another object of the invention to provide a capacitance type wall thickness inspection apparatus in which the output of the head assembly is a d.c. voltage.

It is a further object of the invention to provide a wall thickness inspection apparatus in which any head oscillator assembly may be connected to any data channel in the console.

It is still a further object of the invention to provide a multiple channel glass container inspection machine in which the entire system may be spared with a single head oscillator assembly.

The invention provides an apparatus for inspecting the wall thickness of a glass container, the apparatus being of the type comprising a head assembly for contacting the glass container, a control console supported separately from the head assembly, and an electrical cable connecting the head assembly and the control console, the improvement comprising: the head assembly including: capacitance sensing means; measuring oscillator means responsive to the capacitance sensing means for generating a periodic voltage representative of the sensed capacitance; and head assembly output means responsive to the periodic voltage for providing an output d.c. voltage to the cable representative of the sensed capacitance. In another aspect, the invention provides apparatus for inspecting the wall thickness of a glass container, the apparatus being of the type comprising a head assembly for contacting the glass container, a control console supported separately from the head assembly, and an electrical cable connecting the head assembly and the control console, the improvement comprising: the head assembly including: capacitance sensing means; measuring oscillator means responsive to the capacitance sensing means for generating a periodic voltage representative of the sensed capacitance; and head assembly output means responsive to the periodic voltage for providing an output voltage to the cable which is independent of the frequency of the measuring oscillator means. Preferably the head assembly output means includes a reference oscillator matched in characteristics and frequency to the measuring oscillator. Preferably a DC output voltage is formed across a varactor which forces the reference and measuring oscillators to operate at equal frequencies where the varactor has a well defined voltage versus capacitance characteristic. Preferably this is accomplished with a phased locked loop. Preferably the phase locked loop includes a voltage controlled oscillator (VCO) portion. Preferably the varactor is used to adjust the VCO frequency. Preferably the reference oscillator is used as the VCO portion. Preferably the head assembly output means includes the phase detector portion of the phase locked loop. Preferably the head assembly contains a gain compensating element that keeps the portion of open loop gain located in the head assembly equal for different channel frequencies. Preferably the gain is made equal by scaling one of two inputs to a multiplying phase detector with a network. Preferably the scaled network element is a resistor. Preferably there are two or more of the head assemblies, each head assembly including a measuring oscillator means having a different frequency of oscillation, and the console comprises two or more wall thickness data channels, and any one of the two or more head assemblies may be connected into any one of the two or more data channels without significantly changing the wall thickness inspecting capability of the apparatus.

The invention also provides a method of repairing a glass container inspection machine of the type having p head assemblies, a console and connector means for connecting the head assemblies to the console, each of the p head assemblies including a capacitive sensing means having a measuring oscillator which oscillates at a frequency that is different for each of the p head assemblies, where p is a number greater than 1, the method comprising the steps of: providing an mth head assembly where m=p+1, the mth head assembly including a capactive sensing means having a measuring oscillator which oscillates at an mth frequency different from each of the p frequencies; disconnecting one of the p head assemblies from the console; and connecting the mth head assembly to the console in place of the one of the p head assemblies that was disconnected. Preferably, p equals 4. Preferably, the method further includes the steps of: providing an nth head assembly where n=p+2, the nth head assembly including a capacitive sensing means having a measuring oscillator which oscillates at an nth frequency that is different from each of the p frequencies and the mth frequency; disconnecting either another one of the p head assemblies or the mth head assembly from the console; and connecting the nth head assembly in place of the disconnected one of the p head assemblies or the disconnected mth head assembly.

The glass container inspecting machine according to the invention not only provides a head assembly output that is independent of the measuring oscillator frequency and the possibility of sparing the whole system with a single head assembly, but it also is more accurate and reliable than prior art glass container inspecting machines. Other objects and advantages of the present invention will become apparent from the following portion of the specification and from the following drawings which illustrate in accordance with the mandate of the patent statutes a presently preferred embodiment incorporating the principles of the invention.

BRIEF DESCRIPTION OF THE DRAWINGS

Referring to the drawings.

DESCRIPTION OF THE PREFERRED EMBODIMENT

Figure 1:
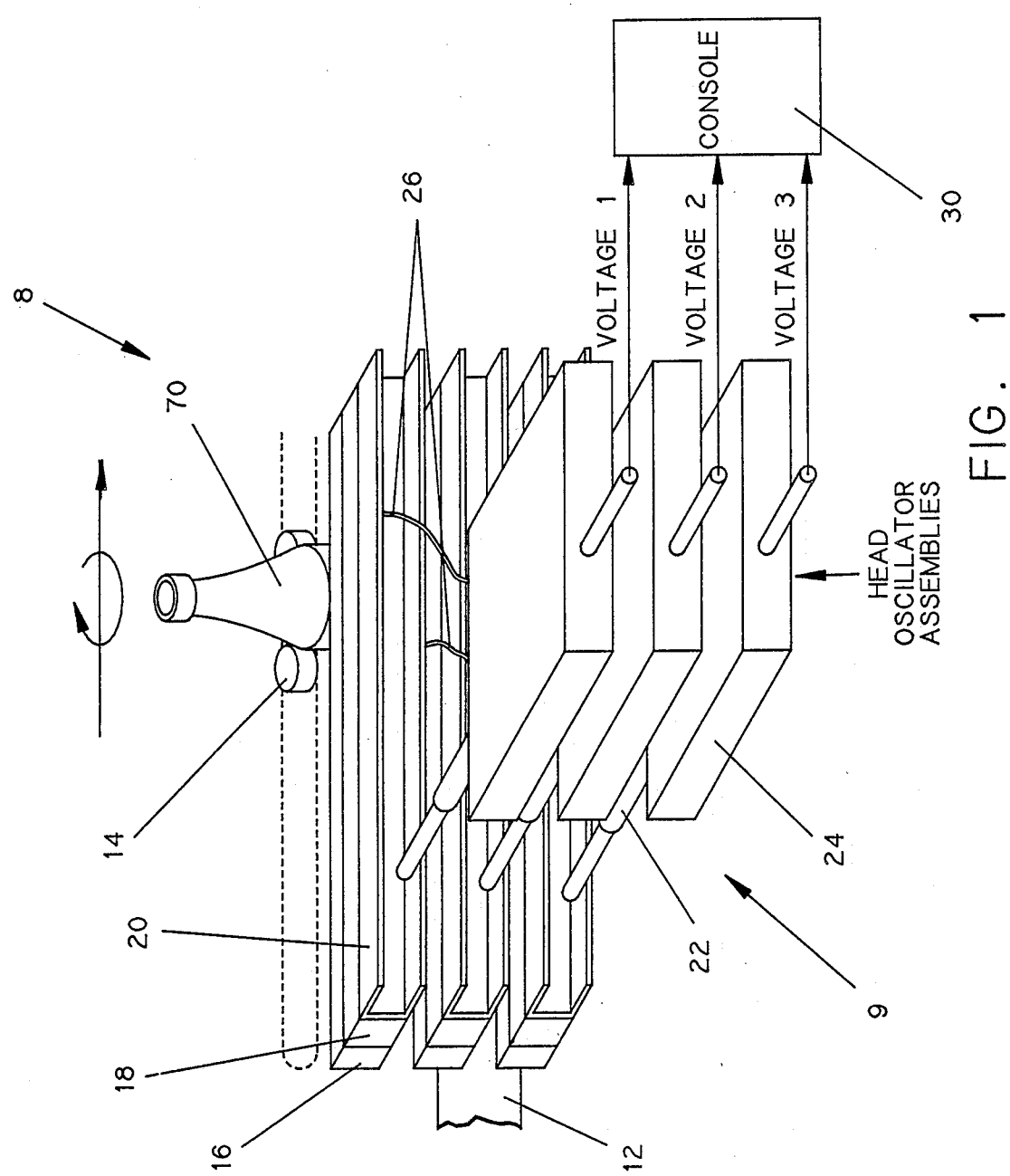
FIG. 1 is an oblique view of a portion of a test station of a glass container inspecting machine.
Figure 2:
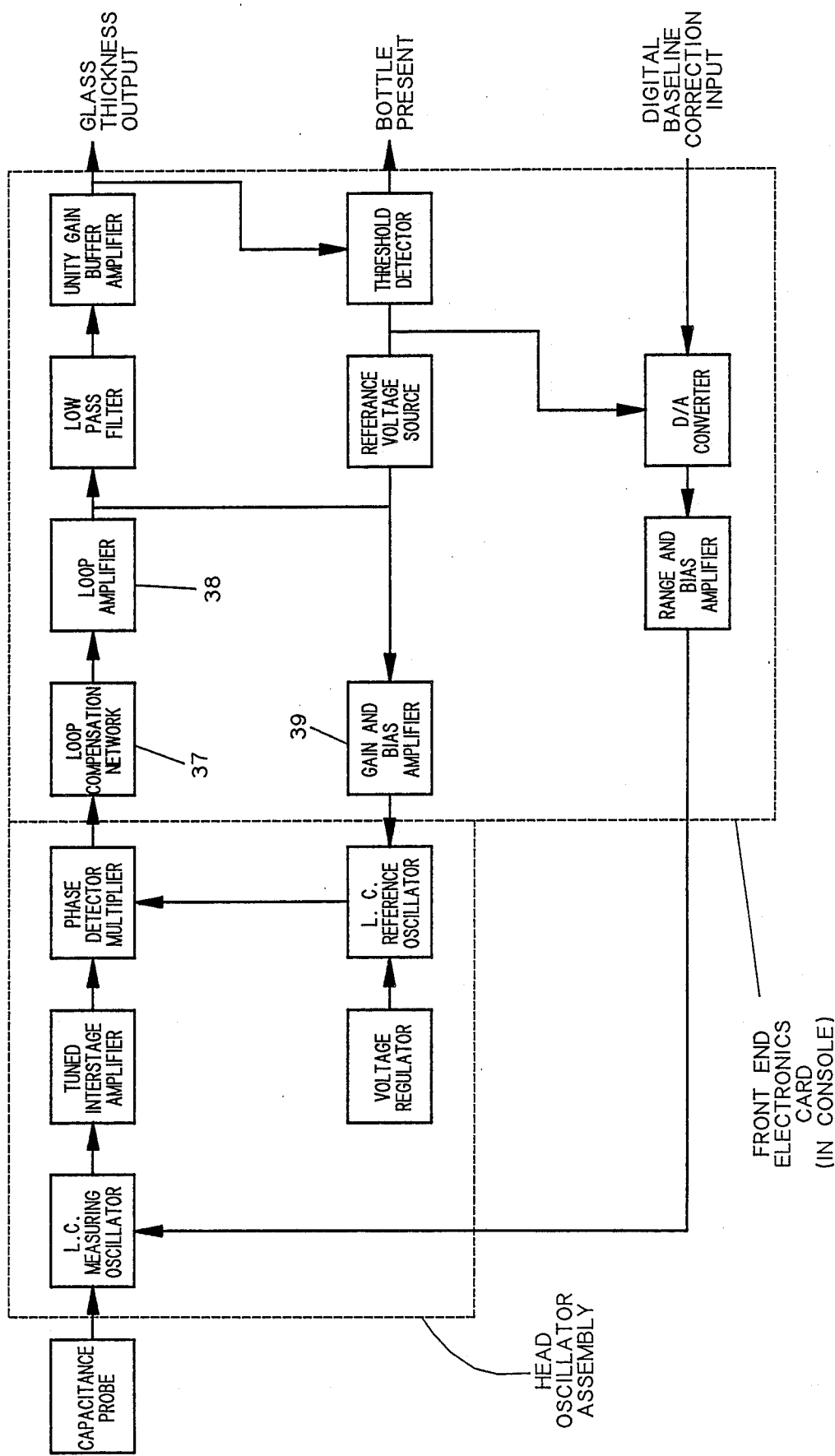
FIG. 2 is an electronic schematic diagram for the test station illustrated in FIG. 1 and showing the various parts which are in the head assembly and the console.
Figure 3:
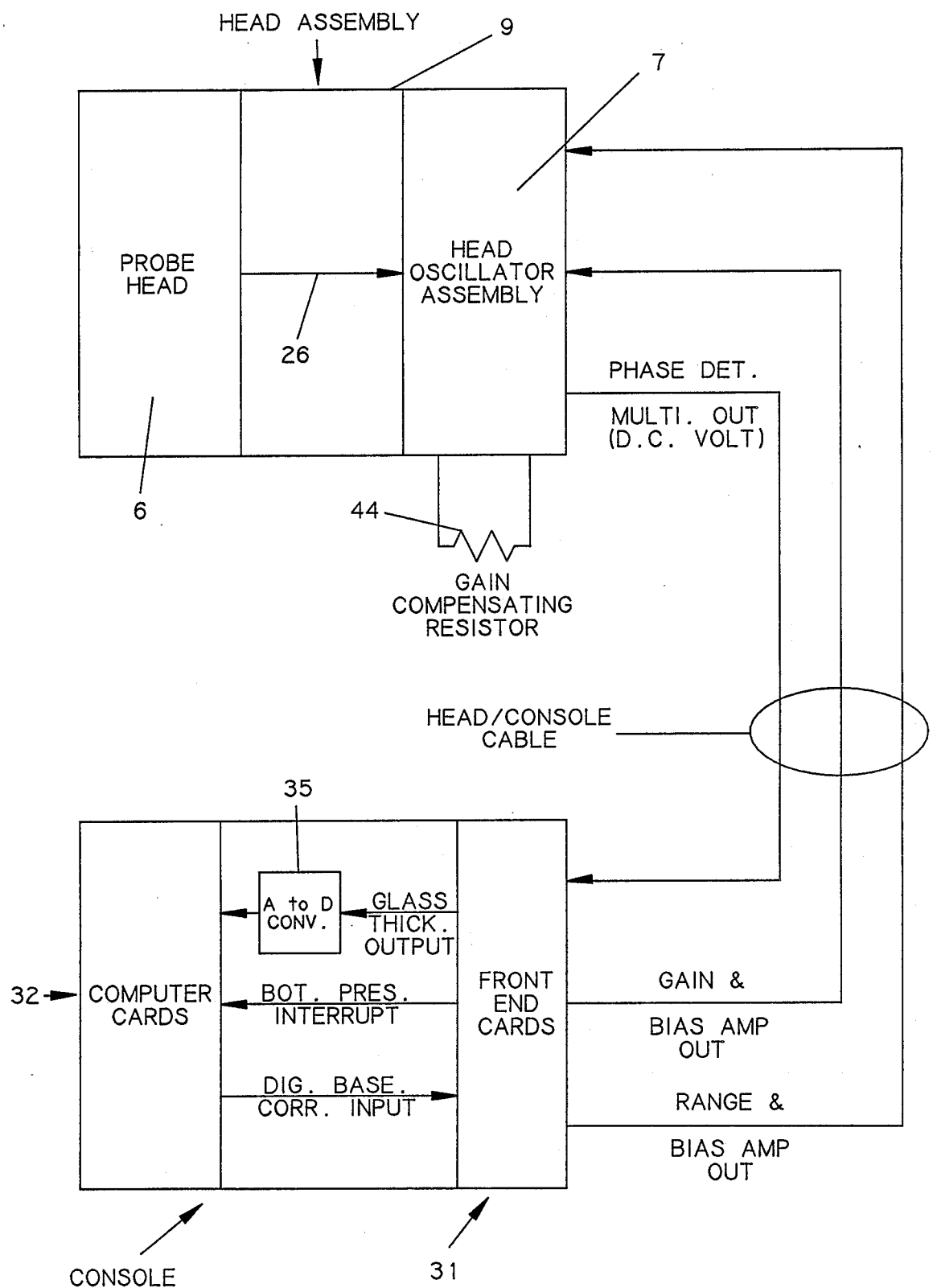
FIG. 3 is a block diagram of the head assembly and console relating the various subcircuits of FIG. 2 and the connection between them to the head assembly, the console, and the cable connecting the head assembly and console.
Figure 4:
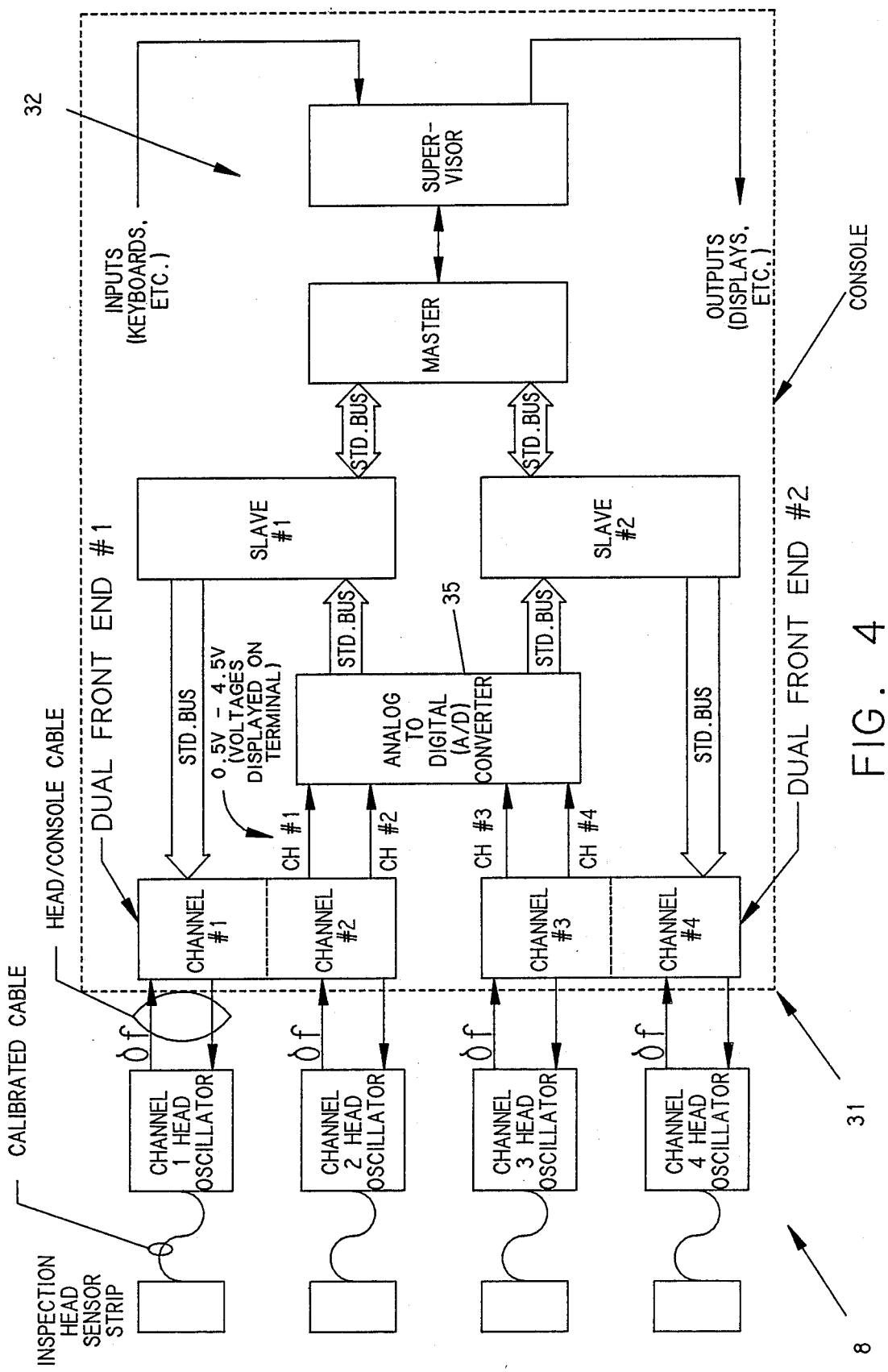
FIG. 4 is a block diagram of a four channel glass container inspecting machine according to the invention.

Directing attention to FIG. 1, a portion of a test station of a glass container inspection machine 8 according to the invention is shown. For simplicity, only three head assemblies 9 are shown although the complete preferred embodiment would have four (see FIG. 4). it is understood that the particular embodiment shown is intended to be exemplary, is shown for purposes of illustration only, and is not intended to limit the invention to the particular embodiment. The glass container inspection machine 8 has a station for testing a round bottle 70 which is supported by a support plate 12 and which is advanced along the support plate 12 by a bottle carrier 14. During its displacement past the test station, the carrier 14 forces the bottle against a number (three shown) of parallel, horizontally extending and vertically spaced capacitance sensing strips 16 which are secured to resilient foam strips 18 mounted on suitable brackets 20. The brackets are connected by posts 22 to corresponding housings 24 for oscillator assemblies which receive a capacitance signal via calibrated cables 26 and generate voltage signals which are supplied to the console 30 which include front end electronics 31 and computer 32 (FIGS. 3 and 4).

Glass thickness measurements are made using the probe and cable assembly which has a capacitance of about 50 pf without glass being sensed. The sensitivity of the probe to glass is about 0.002 pf of capacitance for each $10^{-3}$ of glass and decreases as glass thickness increases.

A capacitance tuned Measuring Oscillator (a transformer coupled LC oscillator) is formed by placing the probe in parallel with a ferrite pot core inductor which has an extra winding for feedback. This measuring oscillator is tuned by the capacitance of the probe and accordingly converts small changes in capacitance (a change in bottle thickness) to small changes in frequency. This output frequency is passed to a Tuned Interstage Amplifier which rejects signals that are outside the frequency range of interest. A capacitance tuned Reference Oscillator which is identical to the Measuring Oscillator is formed using an identical inductor and a stable capacitor that equals the no glass capacitance of the probe and cable assembly.

To each oscillator is added some additional capacitance in the form of a varactor (a capacitor in series with a reversed biased tuning diode). The network values are chosen so that the diode can be biased by means of a biasing resistor over an range of voltages (from $-3$ to $-10$ volts). The value of the capacitance change due to the network and varactor is chosen to be approximately equal to the change in capacitance for the largest glass thickness expected.

In the preferred embodiment, the varactor bias of the Measuring Oscillator is set as a starting point approximately to the mid-point of its range and the bias of the varactor in the Reference Oscillator is set to its minimum point ($-10$ volts in the above example).

A Phase Locked Loop is formed to adjust the voltage to exactly match the capacitance of the probe and glass to the reference capacitance (the varactor) of the Reference Oscillator by coupling the two oscillator outputs with a Phase Detector Multiplier. At least one of the outputs from the oscillators to the Phase Detector Multiplier is adjustable so that the overall loop gain is independent of the oscillator frequency; i.e. so that the Phase Detector Multiplier output is the same for different choices of oscillator frequencies. This adjustment is made via a gain compensating resistor 44 (FIG. 3) in the head oscillator assembly 7. Specifically, the resistor adjusts the output (to the Phase Detector Multiplier) of either the L.C. Measuring Oscillator or the L.C. Reference Oscillator. In the preferred embodiment, the resistor is placed so as to adjust the output of the L.C. Measuring Oscillator by incorporating it in the Tuned Interstage Amplifier so that it adjusts the gain of the amplifier. Preferably, a fixed resistor is used. The fixed resistor is selected at manufacture for each particular head assembly 9 to make the output of the head assembly the same (for a given measured capacitance) for every head assembly no matter what the frequency. The detected phase is fed to a Loop Compensation Network (a band width shaping filter) and Amplifier. Due to the gain of the Amplifier, a small error in phase will result in a substantial output voltage, within the bandwidth of the Amplifier (DC-1000 Hz in the preferred embodiment). The Loop is closed through a Gain and Bias Amplifier which is set as follows: When the amplifier output is at the desired minimum (0 volts in the illustrated case), the varactor is set to minimum capacitance (−10 volts to the varactor). The gain is set so that the desired maximum out of the amplifier (5 volts) sets the varactor to the maximum capacitance (−3 volts to the varactor).

The Phase Locked Loop is closed to force the Measuring Oscillator and the Reference Oscillator to operate at exactly the same frequencies. When no glass is sensed by the probe, the frequencies are equal when the Reference Oscillator varactor is at minimum, so that the output of the Loop Amplifier is zero. As glass is added to the probe, the output of the Loop Amplifier causes the varactor in the Reference Oscillator to change capacitance an amount exactly equal to the change in the Measuring Oscillator capacitance due to the glass wall thickness. The capacitance versus voltage characteristics of the varactor are known, and accordingly, this data can be inverted to form a voltage versus capacitance chart. Varactor capacitance varies slowly as a function of applied voltage. This chart is further shifted to a more convenient voltage scale by the action of the Gain and Bias Amplifier.

The varactor voltage versus capacitance curve is non-linear. A shift in the bias point of the varactor would cause an undesirable shift in scale factor within this scheme. Accordingly, when changes occur that shift the no glass value from the desired set point, a change in voltage is made to the varactor in the Measuring Oscillator. Since the predominant changes that occur are due to temperature, the control input can be referred to as the temperature compensating input. This preserves the scale of the phase locked output.

The glass thickness signal is obtained by passing the output of the Phase Locked Loop through a limiting Low Pass Filter and a Unity Gain Buffer Amplifier. From there, it goes to an A/D Converter to be coupled with the control apparatus as desired.

Samples of the Glass Thickness Output voltage that correspond to no glass are processed by an algorithm that makes adjustments to a D/A converter. The output of the D/A converter is shifted by a Range and Bias amplifier and applied to varactor within the Measuring Oscillator. The varactor acts to adjust the resonant frequency of the Measuring Oscillator to compensate for changes in the Glass Thickness Output at no glass that occur due to effects such as changes in temperature and stray capacitance. Since the phase locked loop keeps the measuring and the reference oscillators at equal frequencies, adjusting the measuring oscillator frequency induces a change in the Glass Thickness Output. The algorithm maintains the D/A voltage at a value required to force the no glass samples of the Glass Thickness Output to a predefined no glass value.

The Measuring Oscillator is applied as the input to a Phase Locked Loop and the Reference Oscillator is used as the voltage controlled oscillator (VCO). Because the phase locked loop tunes the VCO to the Measuring Oscillator frequency, the capacitance of the Reference oscillator matches the capacitance of the probe/bottle combination. Hence the voltage across the varactor in the reference oscillator provides a good representation of the bottle's wall thickness, limited in practice only by the match between the Measuring and Reference Oscillators and by the temperature drift and sensitivity of the varactor.

Since there is a non-linear change in capacitance as a function of thickness over the range provided by glass containers, a linearizer must be provided.

The linearizer uses basic non-linear regression techniques combined with a "good sense" model of the capacitance-wall thickness relationship. While regression techniques are well known, it is also well known that their success depends on a correct choice of model. If the model does not represent the data with sufficient accuracy, the results of the regression will not be accurate. Also, it is very difficult to postulate a "good" model. The relationship between the probe capacitance and the wall thickness of the container is very non-linear. This situation cannot be improved by better probe design because the required circumferential resolution of the measurement is of the same order of magnitude as the wall thickness. Thus, the electric fields in the container must fall-off substantially over the range of container wall thickness, creating a proportionately non-linear capacitance function. The relationship between wall thickness and capacitance cannot be obtained analytically as it is a three-dimensional solution of Maxwell's equations for highly non-idealized geometries. Computer numerical solutions are possible, and while these provide insight into probe design, they are too cumbersome and time consuming to use in a wall thickness instrument to determine the thickness value corresponding to a measure capacitance. However, combining the facts that:

The relationship between thickness and capacitance must be linear for small thickness. As the thickness increases, the capacitance will approach some "infinite thickness" value. Assuming that the "cross-over" point between these two solutions occurs at a thickness value on the order of half the probe spacing, a model can be proposed which has been shown empirically to represent wall thickness data very well. This model is as follows:

$$C(T) = A \times T/(1 + B \times T)$$

where: C is the measured capacitance, T is the wall thickness, A is the coefficient describing the small thickness, linear relationship and B is the coefficient describing the large thickness, non-linear relationship. The "infinite thickness" capacitance is A/B and cross-over wall thickness is 1/B. This model is also easy to employ in a wall thickness device because "pseudo" linear regression techniques can be used to calculate A and B from two or more known pairs (for example determined experimentally) of C and T.

In the preferred embodiment, the glass container inspection machine 8 measures the wall thickness at four locations on each container (FIG. 4). There are four data channels, each data channel including a head assembly 9 and a front end electronic package 31 which is on a separate card in console 30. Each head assembly 9 includes a probe head 6 which includes a sensing strip 16, a foam strip 18, a bracket 20, and a post 22 which connects it to the head oscillator assembly housing 24.

As discussed above, the output of the Phase Locked Loop provides the glass thickness signal. A feature of the invention is that this signal is a d.c. signal that is independent of the measuring oscillator and reference oscillator frequency. Since this signal is independent of frequency, a standard electronics package can be designed which will perform the amplification functions for this signal for any oscillator. In the preferred implementation, some electronic parts of the Phase Locked Loop circuit also are the same for all oscillators. There are the Loop Compensation Network 37, the Loop Amplifier 38, and the Gain and Bias Amplifier 39. All these oscillator frequency independent circuits are put on a front end electronic card 31 in the console. Thus only the oscillation dependent components are included in the head assembly 9. In actual practice, two front end electronic circuits are put on one card to make a dual front end card 41 each carrying the front end electronics for two channels. There are two of the dual front end cards 41 in each console.

It is the nature of capacitance type glass container inspection machines that the oscillator portions of the circuit need to be replaced much more often than other portions of the circuit. Partly this is due to the fact that the electrode strips 16 are part of the measuring oscillator circuit and are subject to wear on the passing bottles and also that the whole head portion is subject to the stress and strain associated with the bottle movement. It is also due to the fact that the oscillator circuits must be necessarily very sensitive in order to detect the change in capacitance due to varying bottle thickness and any change in capacitance in any part of the circuit can change the oscillation frequency. It is a feature of the invention that all the parts that are most subject to failure are placed in one assembly, i.e., the head assembly 9. The front end electronics and computer are relatively durable and can usually be expected to not be replaced for periods comparable to the lifetime of the machine. Thus the invention makes it much less expensive to maintain and operate a wall thickness inspection machine.

It is another feature of the invention that both the measuring oscillator and reference oscillator are in the same physical unit, i.e. the head assembly 9. Capacitive oscillator circuits are very sensitive to temperature changes. Since both the measuring oscillator and reference oscillator are in the same physical unit, the temperature difference between them is generally much smaller than in the prior art systems where one was in the head and the other in the console. Thus the temperature compensation factor is generally a much smaller correction in the present machine than in prior art glass thickness inspection machines and can be made much more accurately. This feature significantly increases the overall accuracy of the inspection machine according to the invention.

Another feature of this invention is the economical manner in which the user can "spare", i.e. maintain an inventory of spare parts for, the machine. To spare a machine, each user need only stock a single replacement head oscillator assembly which operates at a fifth frequency that is different from the oscillation frequency of the other four oscillators. When any one of the head assemblies need replacement, the replacement is made with the "fifth" head assembly. Since this "fifth" frequency is different from all the other frequencies, interference between head assemblies is avoided. Since the output of the head assembly is the same as for any other head assembly (for a given measured capacitance), it can be plugged into the channel vacated by the head assembly that was replaced. One can then repair the replaced head assembly or purchase a new assembly of the same frequency which will then be the "spare channel". Thus at relatively low cost, the user always has a spare available that can replace any of the operating head assemblies. In a like manner, one can spare a three channel system with a "fourth" head assembly, a two channel system with a "third" head assembly or an p channel system with a "mth" head assembly where m=p+1. Or for example, in a 3 channel system, a user could keep a "fourth" and "fifth" head assembly to provide two "spare channels" either of which could replace any of the three channels which would provide more security, but is less expensive than the spare for each channel required by the prior art systems.

A novel machine for inspecting glass containers that provides a head assembly with an output independent of head oscillator frequency and has numerous other features has been described. It is evident that those skilled in the art may now make numerous uses and modifications of and departures from the specific embodiment described herein without departing from the invention concepts. For example, equivalent electronic components and circuits can be used. Different numbers of data channels may be employed. Consequently the invention is to be construed as embracing each and every novel feature and novel combination of features present in and/or possessed by the container inspection apparatus described.

What is claimed is:

1. A method of repairing a glass container inspection machine of the type having p head assemblies, a console and connector means for connecting said p head assemblies to said console, each of said p head assemblies including a capacitive sensing means having a measuring oscillator which oscillates at a frequency that is different for each of said p head assemblies where p is a number greater than 1, said method comprising steps of:

providing an mth head assembly where m=p+1, said mth head assembly including a capacitive sensing means having a measuring oscillator which oscillates at an mth frequency different from each of said p frequencies;

disconnecting a defective one of said p head assemblies from said console; and connecting said mth head assembly into said console in place of said defective one of said p head assemblies that was disconnected.

2. A method in accordance with claim 1, where p equals 4.

3. A method in accordance with claim 1 and further including the steps of:

providing an nth head assembly where n=p+2, said nth head assembly including a capacitive sensing means having a measuring oscillator which oscillates at an nth frequency that is different from each of said p frequencies and said mth frequency;
disconnecting either another one of said p head assemblies or said mth head assembly from said console; and
connecting said nth head assembly in place of said other of said p head assemblies or said mth head assembly that was disconnected.

4. A method in accordance with claim 3 where p equals 3.

* * * * *